(12) United States Patent
Fuka et al.

(10) Patent No.: US 11,368,465 B2
(45) Date of Patent: Jun. 21, 2022

(54) DISTRIBUTED ENTITY COUNTING WITH INHERENT PRIVACY FEATURES

(71) Applicant: Avast Software s.r.o., Prague (CZ)

(72) Inventors: Karel Fuka, Prague (CZ); Matús Baniar, Prievidza (SK)

(73) Assignee: Avast Software s.r.o., Prague (CZ)

( * ) Notice: Subject to any disclaimer, the term of this patent is extended or adjusted under 35 U.S.C. 154(b) by 27 days.

(21) Appl. No.: 16/796,802

(22) Filed: Feb. 20, 2020

(65) Prior Publication Data

US 2020/0274879 A1    Aug. 27, 2020

Related U.S. Application Data

(60) Provisional application No. 62/808,497, filed on Feb. 21, 2019.

(51) Int. Cl.
| | | |
|---|---|---|
| G06F 7/04 | (2006.01) |
| H04L 9/40 | (2022.01) |
| H04L 67/1097 | (2022.01) |
| H04L 9/06 | (2006.01) |

(52) U.S. Cl.
CPC .......... H04L 63/102 (2013.01); H04L 9/0643 (2013.01); H04L 63/08 (2013.01); H04L 63/20 (2013.01); H04L 67/1097 (2013.01)

(58) Field of Classification Search
CPC ....... H04L 63/102; H04L 63/20; H04L 63/08; H04L 63/0414; H04L 63/0407; H04L 9/0643; H04L 67/1097; H04L 2463/121
USPC .......................................................... 726/3
See application file for complete search history.

(56) References Cited

U.S. PATENT DOCUMENTS

| 7,885,928 | B2 * | 2/2011 | Harrington | H04L 67/1008 |
| | | | | 707/637 |
| 9,264,292 | B2 * | 2/2016 | El Osta | H04L 61/1552 |
| 10,194,314 | B2 * | 1/2019 | Slavitch | H04L 29/12943 |
| 10,394,891 | B2 * | 8/2019 | Chen | G06F 16/9024 |
| 10,664,501 | B2 * | 5/2020 | Kandogan | G06F 16/288 |
| 10,803,050 | B1 * | 10/2020 | Salkola | G06K 9/00664 |
| 10,877,991 | B2 * | 12/2020 | Ekbom | G06F 11/1662 |
| 2007/0143289 | A1 | 6/2007 | Dowrk et al. | |
| 2008/0019351 | A1 * | 1/2008 | Piper | G06F 9/5033 |
| | | | | 370/352 |

(Continued)

OTHER PUBLICATIONS www_wired_com_2016_06_apples_differential_privacy_collecting_data; Jun. 13, 2016.

(Continued)

*Primary Examiner* — Amare F Tabor
(74) *Attorney, Agent, or Firm* — Avek IP, LLC; William B. Kircher

(57) ABSTRACT

Systems and methods provide an entity identifier (EID) for use in distributed systems, where the entity identifier includes inherent privacy features and where an estimate of the distinct count of the entity identifiers in a distributed system can be determined. A unique identifier (e.g., a GUID) for an entity is received. A hash value can be generated for the unique identifier using a hash function that is not guaranteed to generate unique values. An EID is created using a portion of the bits of the hash value and stored in a database. An estimated distinct count of entities based on a count of EIDs in the database can be determined based on the count of EIDs in the database and the size of the EID space.

13 Claims, 5 Drawing Sheets

(56) References Cited

U.S. PATENT DOCUMENTS

2016/0314209 A1* 10/2016 Pinkovezky ............ H04L 67/22
2017/0308602 A1* 10/2017 Raghunathan ........ G06F 16/273

OTHER PUBLICATIONS

Pseudonymization_in_GDPR; Nicole Vreeman; Jan. 13, 2017.
Polynomial_regression_wikipedia; date of publication: unknown.
HyperLogLog_Wikipedia; date of publication: unknown.
HyperLogLog: the analysis of a near-optimal cardinality estimation algorithm; 2007 Conference on Analysis of Algorithms, AofA 07; DMTCS proc. AH, 2007, 127-146; Philippe Flajolet et al.; 2007.
Hash_function_Wikipedia; date of publication: unknown.
GDRP_legislation_https_ec_europa_eu_info_law_law_topic_data_protection_en; date of publication: unknown.
Differential_privacy_Wikipedia; date of publication: unknown.
Count_distinct_problem_Wikipedia; date of publication: unknown.

* cited by examiner

DISTRIBUTED ENTITY COUNTING WITH INHERENT PRIVACY FEATURES

RELATED APPLICATION

This Application claims the priority benefit of U.S. Provisional Patent Application Ser. No. 62/808,497, filed on Feb. 21, 2019, entitled "DISTRIBUTED ENTITY COUNTING WITH INHERENT PRIVACY FEATURES," currently, the entire disclosure of which is incorporated herein by reference.

FIELD

The disclosure relates generally to data management on computing systems, and more particularly, to counting distinct entities on distributed computing systems.

BACKGROUND

Privacy concerns have been steadily growing in all communities around the world as use of the Internet and mobile communications have become widespread and people depend on the technologies more than ever. Governments as well as researchers and practitioners have provided different approaches and solutions to address privacy concerns and increase privacy. For instance, in Europe, the General Data Protection Regulation (GDPR) is a major push towards stronger privacy protection for technology users. GDPR recommends various techniques to preserve basic privacy for end users, for example, pseudonymization and similar techniques. Technology companies and research communities have also attempted to address these privacy concerns.

Privacy concerns can arise in distributed systems. A distributed system is one in which network connected devices, mobile devices etc. communicate with other devices and perhaps services provided by other devices. An important task for system monitoring, planning and maintenance can be to understand how many unique entities are within the distributed system. An entity can be a user, device, application, agent etc. An entity can typically be assigned an identifier that uniquely identifies the entity within the distributed system. Thus, one way to count the number of entities in the distributed system is to determine the number of distinct identifiers associated with entities in the distributed system.

There are many algorithms that assign unique identifiers to entities, some can be totally distributed without any central authority, some centrally coordinated. A "GUID" (Globally Unique Identifier) is one such identifier that has been developed to uniquely identify entities. Regardless of the way they are constructed, an important feature is that a GUID is unique and it always identifies the same entity. Thus, there is a one-to-one mapping between the entity and GUID.

When considering privacy issues, the above schema is not completely anonymous. For example, because of the one-to-one mapping between a GUID and an entity, data records that contain a particular GUID will always be associated with the same entity referred to by the GUID. Thus, an entity can be tracked using its assigned GUID.

Multiple approaches have attempted to increase the privacy related to the use of GUIDs. One such approach is to pseudonymize the database. This can be done by applying a hashing function to a GUID. The result of this is that the GUID is replaced by its hash value—hash(GUID). Because this is another unique identifier, the distinct count can be easily obtained using the hashed GUID value. While this approach provides somewhat more privacy in certain scenarios and provides protection in the case of data leakage, there are still privacy concerns raised in some corner cases. For example, it may be possible to discover the hash value of an entity's GUID. Once the hash value is known, it can be possible to answer the question if a record related to a particular entity is in the database or not. When this occurs, it is said that entity is "trackable" in a data set.

Another approach recently becoming popular in the industry is called differential privacy. As a simplified example, a probabilistic distribution function can be applied to determine when to use a GUID in a data record. The probabilistic distribution function can be used to determine if the GUID is used, or if some other value is used in place of the GUID (e.g., modified bits of the GUID). The resulting data set will not only contain GUIDs, but also values that do not correspond to any entity (effectively random numbers). As a result, while privacy is increased, the data set cannot be used for determining a distinct count of entities in a data set.

BRIEF DESCRIPTION OF THE DRAWINGS

For a better understanding of the inventive subject matter, reference may be made to the accompanying drawings in which.

DETAILED DESCRIPTION

In the following detailed description of example embodiments, reference is made to the accompanying drawings that form a part hereof, and in which is shown by way of illustration specific example embodiments in which the inventive subject matter may be practiced. These embodiments are described in sufficient detail to enable those skilled in the art to practice the inventive subject matter, and it is to be understood that other embodiments may be utilized and that logical, mechanical, electrical and other changes may be made without departing from the scope of the inventive subject matter.

Some portions of the detailed descriptions which follow are presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, terms such as "processing" or "computing" or "calculating" or "determining" or "displaying" or the like, refer to the action and processes of a computer system, or similar computing device, that manipulates and transforms data represented as physical (e.g., electronic) quantities within the computer system's registers and memories into other data similarly represented as physical quantities within the computer system memories or registers or other such information storage, transmission or display devices.

The description of the various embodiments is to be construed as describing examples only and does not describe every possible instance of the inventive subject matter. Numerous alternatives could be implemented, using combinations of current or future technologies, which would still fall within the scope of the claims. The following detailed description is, therefore, not to be taken in a limiting sense, and the scope of the inventive subject matter is defined only by the appended claims.

Example Embodiments

Figure 1:
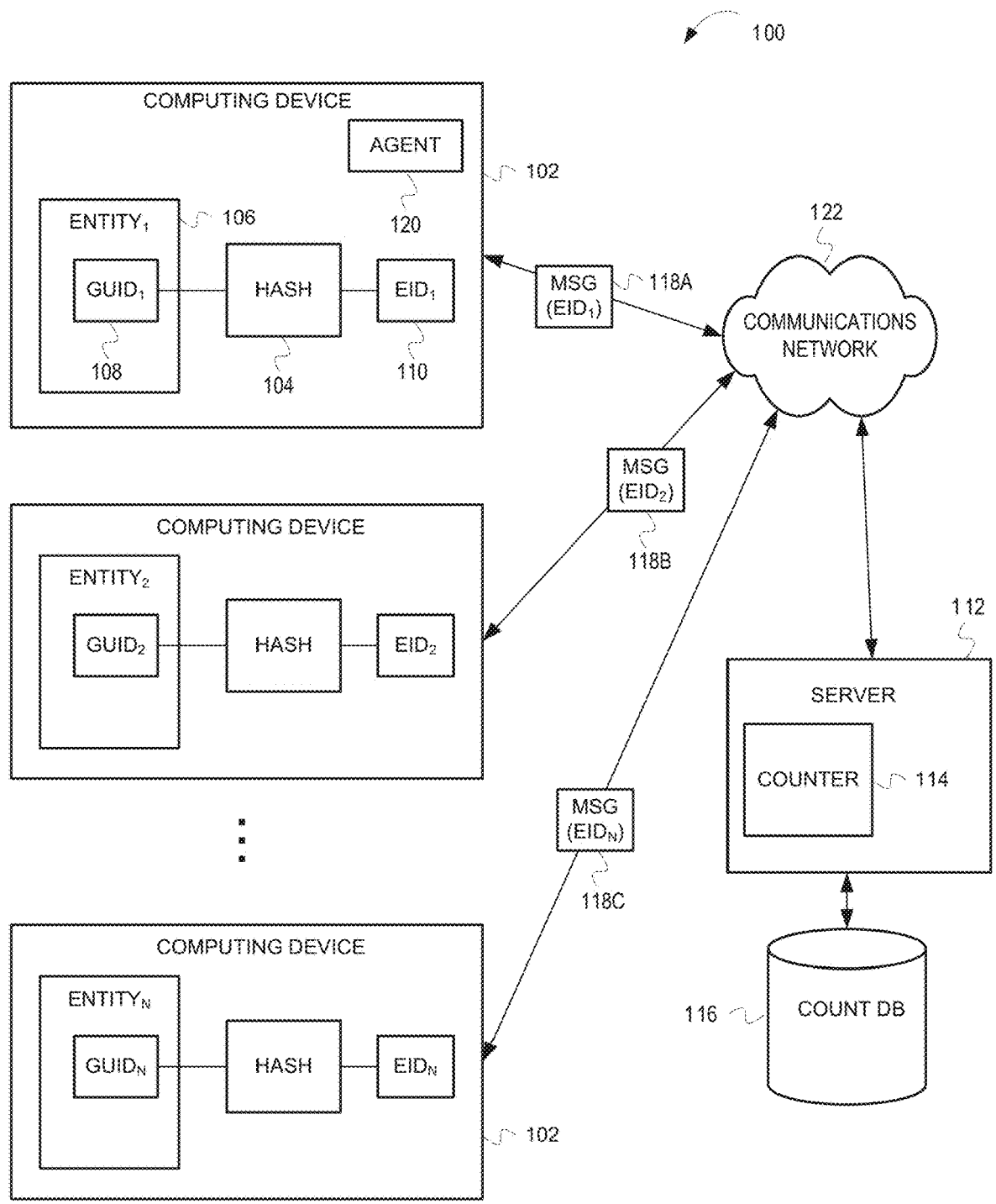
FIG. 1 is a block diagram illustrating components of a system for distributed identity counting that preserves privacy according to embodiments.

FIG. 1 is a block diagram illustrating components of a system 100 for distributed identity counting that preserves privacy according to embodiments. System 100 can comprise a distributed system of computing devices 102 and a server 112 communicably coupled to a network 122. Network 122 can be any collection of one or more wired networks, wireless networks, or combinations of the two. Network 122 can be a local network, a corporate network, campus network, etc. In some aspects, network 122 can include one or more networks that make up the Internet.

The computing devices 102 can be any type of device having at least one processor and a memory. As an example, a computing device 102 can be any of a desktop computer, laptop computer, tablet computer, smart phone, printer, game console, set top box, Internet of Things (IoT) device, router, switch, etc. The embodiments are not limited to any particular type of computing device. The computing devices 102 in a system 100 can be of disparate types and be configured in different ways from one another.

A computing device 102 can include one or more entities 106. An entity can represent a user of computing device 102, a device on or coupled to computing device 102, an application running on computing device 102, agent software on computing device 102 etc. Each distinct entity 106 can be associated with an identifier such as a GUID 108 uniquely identifying the entity within system 100. In the example illustrated in FIG. 1, one entity 108 is shown in computing system 102. Those of skill in the art having the benefit of the disclosure will appreciate that a typical computing device 102 can have more than one entity 108, and may in fact have many more, for example, hundreds or thousands of entities.

In order to facilitate counting of entities within system 100, a computing device 102 may transmit messages 118 that include identifiers of the entities currently on the computing device 102. In some embodiments, the messages can be transmitted to server 112, which can process the messages and store the identifiers in a count database 116. In alternative embodiments, a computing device 102 can transmit the message directly to count database 116 or a database server that maintains count database 116. In some aspects, a message 118 can be generated by the entity 106. For example, a software application running on the computing device 102 can generate a message 118. In alternative aspects, the message can be generated by an agent program 120 on behalf of the entity. For example, an agent program 120 can determine hardware devices on a system along with their respective GUIDs, and generate a message or messages that includes identifiers for the hardware devices.

In order to enhance privacy within the system 100, the identifier in a message 118 is not the GUID 108 associated with an entity. Instead, a transformation function 104 is applied to the GUID 108 to create an Entity Identifier (EID) 110. Unlike the hash functions typically used to pseudonymize data, the transformation function 104 is not guaranteed to result in a unique identifier. In other words, there can be collisions between EIDs generated for different entities. Thus, unlike GUIDs, EIDs are not guaranteed to be unique within a system 100.

In some aspects, a timestamp can be associated with a message 118. The timestamp can be determined by the entity generating the message 118 and included in the message 118. Alternatively, server 112 can generate a timestamp when a message 118 is received. Further, a database server for count database 116 can generate a timestamp when a record containing an EID 110 is entered into the count database 116. In any case, the timestamp can be associated with the EID in count database 116.

An entity is considered "alive" if it sends at least one message during a timeframe of interest. While there is no requirement with respect to how many messages an entity 108 can send within a specified timeframe, a message 118 including an EID 110 for entity 106 has to be sent at least once in order for the entity 108 to be counted as part of the system 100.

The number of entities 108 that are alive within a certain time frame can be obtained from the count database 116 by performing a distinct count over the stored messages 118 that have arrived within the specified timeframe. In some aspects, only distinct EIDs 110 are counted because an entity 108 may send multiple messages within the same timeframe.

A counter 114 can determine a count of distinct EIDs, and further determine an estimate of the number of actual "alive" entities in a distributed system based on the number of distinct EIDs. The count of distinct EIDs can be limited to EIDs received by server 112 and/or inserted into count database 116 during a particular timeframe. Although shown as residing on server 112 in the example embodiment illustrated in FIG. 1, the counter 114 can be on any computing device having access to count database 116. Further, counter 114 can be a standalone application or service, it can be a component of an application, system program, operating system component, or any other unit of executable code.

The count of distinct EIDs can be used in various practical applications for monitoring, planning and maintenance with respect to distributed systems. As an example, the count of distinct EIDs can be used to determine a number of existing users of a distributed system. Further, the count of EIDs representing current users can be compared to past user counts in to determine how the user base is changing in order to size the number of servers or other devices required to serve future users. A further practical application includes utilizing the aspects described herein in a distributed software system comprising multiple software agents. The software agents can provide different functionalities for their users (for example a software agent can be antivirus software, text processing software, or any other software distributed over Internet). A software author or distributor may be interested in how many software agent instances have been distributed so far or are currently in use. The software author may use this information to plan resources for its backend applications or project a number of future downloads. The software author does not need to know the identity of the respective users which can allow the software author to protect user's privacy. Using the techniques described herein, the software author can use the EID disclosed herein to determine with a sufficient accuracy the number of running software agents within a time span t, but because of inherent privacy features of EID, the EID cannot be linked to a concrete user with a deterministic accuracy. Thus, a practical application includes introducing privacy features in a software agent counting process.

The aspects described herein are not limited to any particular use case or application. Further, the techniques described herein can provide advantages over previous systems. For example, the EID and methods for creating and using an EID described herein can provide reasonably accurate counts of entities in a system while preserving the privacy of the entities and users of the entities.

Figure 2:
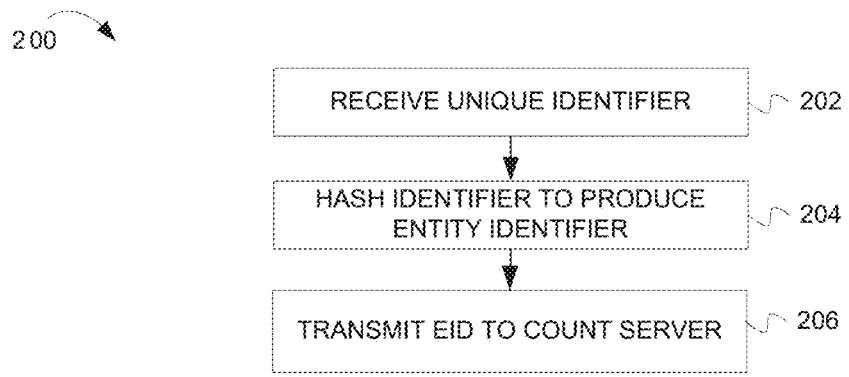
FIG. 2 is a flow chart illustrating operations performed to generate an entity identifier on a computing device in a distributed system.

FIG. 2 is a flow chart illustrating operations performed to generate an entity identifier 110 on a computing device 102 in a distributed system 100. The operations can be performed when an entity (or an agent acting on behalf of an entity) determines to generate an EID 110 for transmission to a server for insertion into a count database 116.

At block 202, a unique identifier is received. In some aspects, the unique identifier can be a GUID.

At block 204, a transformation function is applied to the unique identifier to produce an EID. As noted above, the transformation function is configured such that the EID is not guaranteed to be unique within a system, and there can be collisions between the EIDs of different entities. In some embodiments, the transformation function comprises applying a hash function to the GUID, and then performing a bit shift on the hash value. For example, a hash value can be generated from a GUID, and then right shifted by n bits. The resulting value comprises the EID 110. Taking only n bits of the hash value results in the possibility of multiple collisions in a data set of EIDs. In some embodiments, n=32.

In some embodiments, the hash function can be a version of the MurmurHash hash function. For example, the MurmurHash64 hash function can be used to generate 64 bit hash values. The MurmurHash function is a non-cryptographic hash function. In alternative embodiments, other non-cryptographic hash functions can be used. In further alternative embodiments, a cryptographic hash function can be used. The embodiments are not limited to any particular hash function.

The number of bits to shift, n, can have a direct impact on the number of collisions. In some embodiments, n can be chosen based on application requirements and the sensitivity of n on the selected hash function.

At block 206, the EID can be transmitted to a server or directly inserted into a count database.

From the above it will be appreciated that a property of the EID generated as described above is that the EID cannot be used to track an entity in a database with 100% confidence due to the possibility of collisions. Thus, even if an EID to GUID association is known or discovered, the EID is unusable for entity identification because there can be no certainty that a different GUID for a different entity also maps to the same EID.

Further, it will be appreciated from the above discussion that because of the possibility of collisions, a count of the number of EIDs will typically be less than the actual number of GUIDs (and entities) in a system. Thus, a modified distinct count is employed in some embodiments to determine an estimated count of the number of entities in a distributed system. The modified distinct count can be configured to take into account the possibility of collisions in order to determine an estimated actual number of entities in a system.

Figure 3:
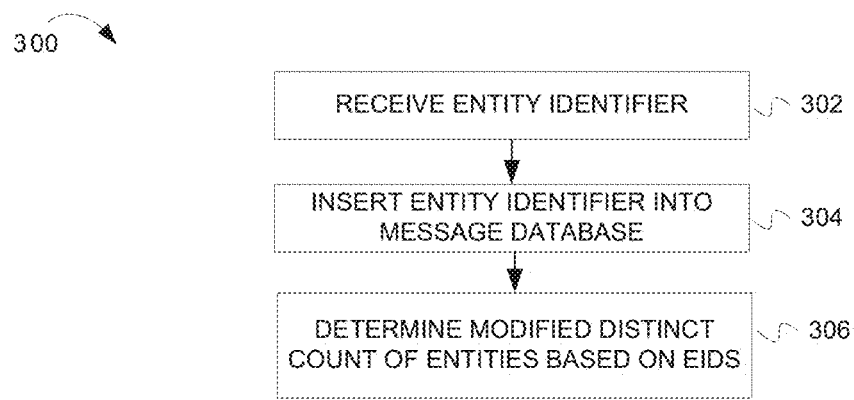
FIG. 3 is a flow chart illustrating operations to determine a modified distinct count of the number of entities in a distributed system.

FIG. 3 is a flow chart illustrating operations to determine a modified distinct count of the number of entities 106 in a distributed system 100.

At block 302, an EID is received. The EID can be received by a server, or a database system.

At block 304, the EID is inserted into a count database. In some embodiments, a timestamp is associated with the insertion of the EID into the database. The timestamp can be determined at the time the EID is received in a message. Alternatively, the timestamp can be embedded in the message.

At block 306, a modified distinct count of entities is determined based on the EIDs in the count database. In some aspects, the count can be limited to a certain timeframe using timestamps associated with the EIDs.

In some embodiments, the modified distinct count of entities can be determined based on adjusting a distinct count of EIDs. Adjusting the distinct count of EIDs can be based on approximation techniques. For example, a function $f$ can be determined such that:

$$N \approx f(H, D) \tag{1}$$

where:

N is the number of real entities (i.e., the actual number of distinct GUIDs),

H is the number of distinct EIDs, and

D is the number of possible outputs of the hashing function (e.g., EID space).

In some aspects, the distinct count of EIDs can be adjusted according to function fitting based on generated data. In this example embodiment, various groups of EIDs can be hashed using various hash sizes to obtain a training set of data values N, H and D. The training set of data can then be used to find a function $f$ as a fit using, for instance, techniques of polynomial regression.

In other aspects, the distinct count of EIDs can be adjusted by an approximation based on solution of an inverse problem. In this example embodiment, an inverse problem is the starting point. Let the function e denote the expected value of H for a given N and D. It can be proved that:

$$e(N, D) = D \cdot \left(1 - \left(\frac{D-1}{D}\right)^N\right) \tag{2}$$

The function e(N,D) can be considered an approximation function for H. Thus, e(N,D)≈H. Next, a function $f(H,D)$ can be determined such that e(f(H,D), D)≈H which can then be used as an approximation of N in the original problem. Using equation 2, f(H,D) can be determined as:

$$N \approx f(H, D) = \frac{\log\left(1 - \frac{H}{D}\right)}{\log(D-1) - \log(D)}, \text{ for } D > H > 0 \tag{3}$$

Figure 4:
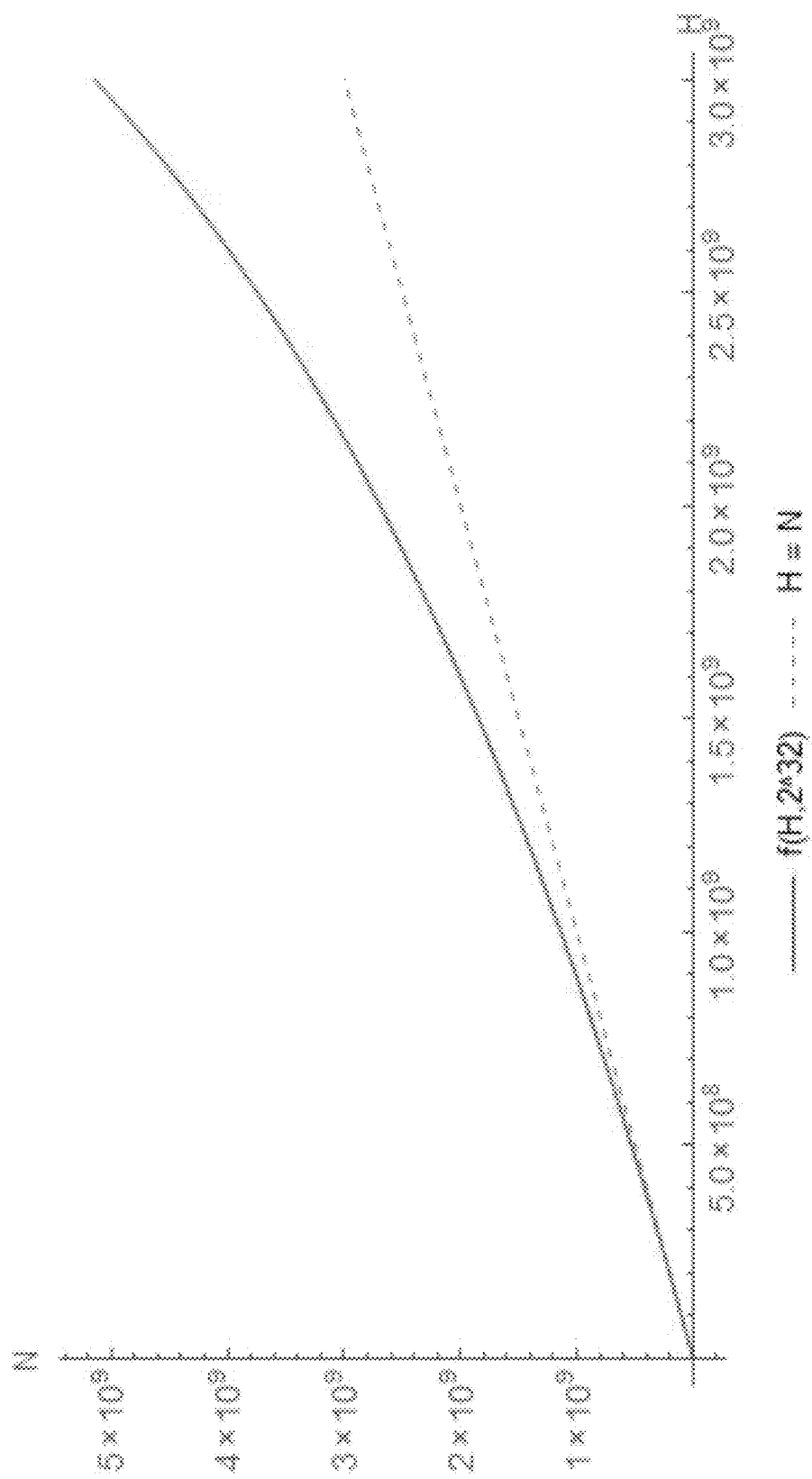
FIG. 4 illustrates an example graph of an approximation function for determining a modified distinct count of the number of entities.

FIG. 4 illustrates an example graph of this function for a hash size $D=2^{32}$.

In alternative embodiments, the modified count of distinct entities can be determined based on a modified HyperLogLog (HLL) algorithm. The HLL algorithm is a probabilistic cardinality estimator. Calculating the exact cardinality of a data set can require an amount of memory proportional to the cardinality, which is impractical for very large data sets. The HLL algorithm can use significantly less memory, at the cost of obtaining only an approximation of the cardinality. The HLL algorithm comprises three main operations, an add operation, a count operation, and a merge operation. In the add operation, a hash function is applied to the input data. Further details on the HyperLogLog algorithm can be found in Philippe Flajolet, P., Fusy, E., Gandouet, O. & Meunier, F. (2007). "HyperLogLog: the analysis of a near-optimal cardinality estimation algorithm." In *DMTCS Proceedings vol. AH*, Conference on Analysis of Algorithms (AofA 07) *DMTCS proc. AH*, 2007, 127-146. Nancy, France: Discrete Mathematics and Theoretical Computer Science (DMTCS). In some embodiments, the add operation is modified such that the hash operation is not performed on an EID (as it is already hashed). Thus, the hash function is essentially replaced with an identity function, and such function is called a modified HyperLogLog.

Figure 5:
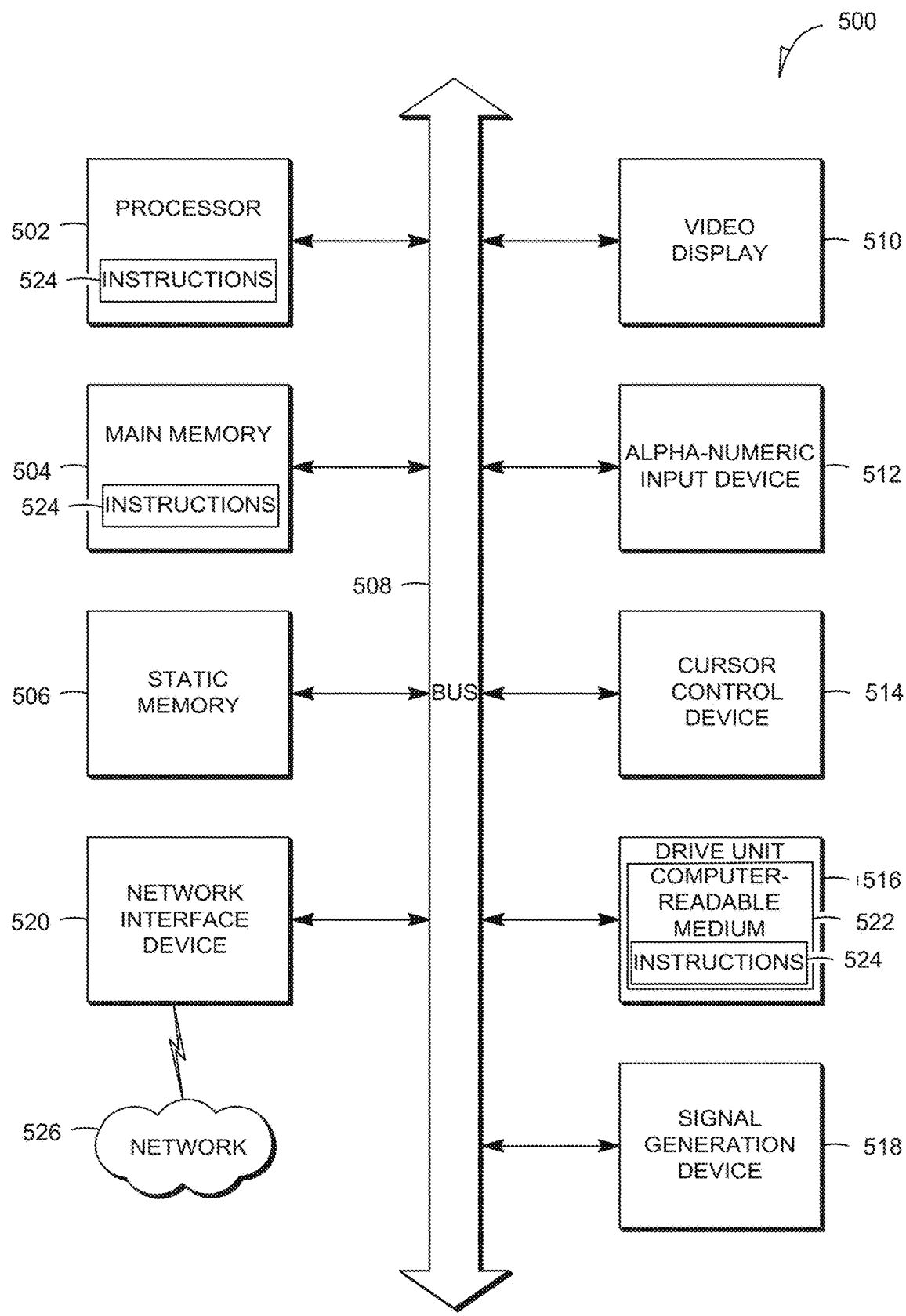
FIG. 5 is a block diagram of an example embodiment of a computer system upon which embodiments of the inventive subject matter can execute.

With reference to FIG. 5, an example embodiment extends to a machine in the example form of a computer system 500 within which instructions for causing the machine to perform any one or more of the methodologies discussed herein may be executed. In alternative example embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. Further, while only a single machine is illustrated, the term "machine" shall also be taken to include any collection of machines that individually or jointly execute a set (or multiple sets) of instructions to perform any one or more of the methodologies discussed herein.

The example computer system 500 may include a processor 502 (e.g., a central processing unit (CPU), a graphics processing unit (GPU) or both), a main memory 504 and a static memory 506, which communicate with each other via a bus 508. The computer system 500 may further include a touchscreen display unit 510. In example embodiments, the computer system 500 also includes a network interface device 520.

The persistent storage unit 516 includes a machine-readable medium 522 on which is stored one or more sets of instructions 524 and data structures (e.g., software instructions) embodying or used by any one or more of the methodologies or functions described herein. The instructions 524 may also reside, completely or at least partially, within the main memory 504 or within the processor 502 during execution thereof by the computer system 500, the main memory 504 and the processor 502 also constituting machine-readable media.

While the machine-readable medium 522 is shown in an example embodiment to be a single medium, the term "machine-readable medium" may include a single medium or multiple media (e.g., a centralized or distributed database, or associated caches and servers) that store the one or more instructions. The term "machine-readable medium" shall also be taken to include any tangible medium that is capable of storing, encoding, or carrying instructions for execution by the machine and that cause the machine to perform any one or more of the methodologies of embodiments of the present invention, or that is capable of storing, encoding, or carrying data structures used by or associated with such instructions. The term "machine-readable storage medium" shall accordingly be taken to include, but not be limited to, solid-state memories and optical and magnetic media that can store information in a non-transitory manner, i.e., media that is able to store information. Specific examples of machine-readable storage media include non-volatile memory, including by way of example semiconductor memory devices (e.g., Erasable Programmable Read-Only Memory (EPROM), Electrically Erasable Programmable Read-Only Memory (EEPROM), and flash memory devices); magnetic disks such as internal hard disks and removable disks; magneto-optical disks; and CD-ROM and DVD-ROM disks. A machine-readable storage medium does not include signals.

The instructions 524 may further be transmitted or received over a communications network 526 using a signal transmission medium via the network interface device 520 and utilizing any one of a number of well-known transfer protocols (e.g., FTP, HTTP). Examples of communication networks include a local area network (LAN), a wide area network (WAN), the Internet, mobile telephone networks, Plain Old Telephone (POTS) networks, and wireless data networks (e.g., WiFi and WiMax networks). The term "machine-readable signal medium" shall be taken to include any transitory intangible medium that is capable of storing, encoding, or carrying instructions for execution by the machine, and includes digital or analog communications signals or other intangible medium to facilitate communication of such software.

Although an overview of the inventive subject matter has been described with reference to specific example embodiments, various modifications and changes may be made to these embodiments without departing from the broader scope of embodiments of the present invention. Such embodiments of the inventive subject matter may be referred to herein, individually or collectively, by the term "invention" merely for convenience and without intending to voluntarily limit the scope of this application to any single invention or inventive concept if more than one is, in fact, disclosed.

As is evident from the foregoing description, certain aspects of the inventive subject matter are not limited by the particular details of the examples illustrated herein, and it is therefore contemplated that other modifications and applications, or equivalents thereof, will occur to those skilled in the art. It is accordingly intended that the claims shall cover all such modifications and applications that do not depart from the spirit and scope of the inventive subject matter. Therefore, it is manifestly intended that this inventive subject matter be limited only by the following claims and equivalents thereof.

The Abstract is provided to comply with 37 C.F.R. § 1.72(b) to allow the reader to quickly ascertain the nature and gist of the technical disclosure. The Abstract is submitted with the understanding that it will not be used to limit the scope of the claims.

What is claimed is:

1. A method for determining a count of entities in a distributed system, the method comprising:

receiving, from one or more computing devices, a unique identifier for an entity;

generating, by one or more processors, a hash value for the unique identifier using a hash function;

creating, by the one or more processors, an entity identifier (EID) according to a portion of the bits of the hash value, wherein the EID is not guaranteed to be unique within the distributed system;

storing, by the one or more processors, the EID in a database; and determining, by the one or more processors, an estimated distinct count of entities based on a count of EIDs in the database, wherein determining the estimated distinct count of entities comprises updating the count of EIDs in the database, and wherein updating the count of EIDs in the database comprises applying an inverse function $f$ of a function that determines an expected value of the distinct count of entities based on a number of unique identifiers and an EID space, wherein $f$ comprises:

$$N \approx f(H, D) = \frac{\log\left(1 - \frac{H}{D}\right)}{\log(D - 1) - \log(D)}, \text{ for } D > H > 0$$

where:
  N comprises the number of actual entities,
  H comprises the number of EIDs, and
  D is the size of the EID space.

2. The method of claim 1, wherein the hash function generates a value that is not guaranteed to be unique within the distributed system.

3. The method of claim 1, wherein the unique identifiers comprise Globally Unique Identifiers (GUIDS).

4. The method of claim 1, wherein determining the estimated distinct count of entities comprises performing a modified HyperLogLog algorithm on the EIDs in the database, wherein a hash function of an add operation of the modified HyperLogLog algorithm comprises an identity function.

5. A distributed system comprising:

a computing device having one or more processors; and a machine-readable storage medium coupled to the computing device, the machine-readable storage medium having stored thereon instructions executable by the one or more processors to cause the computing device to:

determine a unique identifier for an entity;

generate a hash value for the unique identifier using a hash function;

create an entity identifier (EID) according to a portion of the bits of the hash value, wherein the EID is not guaranteed to be unique within the distributed system;

store the EID in a database; and a counter configured to determine an estimated distinct count of entities based on a count of EIDs in the database, wherein the counter is configured to update the count of EIDs in the database and to apply an inverse function $f$ of a function that determines an expected value of the distinct count of entities based on a number of unique identifiers and an EID space, wherein $f$ comprises:

$$N \approx f(H, D) = \frac{\log\left(1 - \frac{H}{D}\right)}{\log(D - 1) - \log(D)}, \text{ for } D > H > 0$$

where:
  N comprises the number of actual entities,
  H comprises the number of EIDs, and
  D is the size of the EID space.

6. The distributed system of claim 5, wherein the instructions to cause the computing device to store the EID in the database comprise instructions to transmit the EID to a server maintaining the database.

7. The distributed system of claim 5, wherein the hash function generates a value that is not guaranteed to be unique within the distributed system.

8. The distributed system of claim 5, wherein the unique identifiers comprise Globally Unique Identifiers (GUIDS).

9. The distributed system of claim 5, wherein the counter configured to determine the estimated distinct count of entities comprises the counter configured to perform a modified HyperLogLog algorithm on the EIDs in the database, wherein a hash function of an add operation of the modified HyperLogLog algorithm comprises an identity function.

10. A machine-readable medium having stored thereon instructions to cause one or more processors to:

determine a unique identifier for an entity;

generate a hash value for the unique identifier using a hash function;

create an entity identifier (EID) according to a portion of the bits of the hash value, wherein the EID is not guaranteed to be unique within the distributed system;

store the EID in a database; and determine an estimated distinct count of entities based on a count of EIDs in the database, wherein determining an estimated distinct count of entities comprises updating the count of EIDs in the database and applying an inverse function $f$ of a function that determines an expected value of the distinct count of entities based on a number of unique identifiers and an EID space, wherein $f$ comprises:

$$N \approx f(H, D) = \frac{\log\left(1 - \frac{H}{D}\right)}{\log(D - 1) - \log(D)}, \text{ for } D > H > 0$$

where:
  N comprises the number of actual entities,
  H comprises the number of EIDs, and
  D is the size of the EID space.

11. The machine-readable medium of claim 10, wherein the hash function generates a value that is not guaranteed to be unique within the distributed system.

12. The machine-readable medium of claim 10, wherein the unique identifiers comprise Globally Unique Identifiers (GUIDS).

13. The machine-readable medium of claim 10, wherein the instructions to determine the estimated distinct count of entities comprise instructions to perform a modified HyperLogLog algorithm on the EIDs in the database, wherein a hash function of an add operation of the modified HyperLogLog algorithm comprises an identity function.

* * * * *